(12) United States Patent
Zboril

(10) Patent No.: US 7,126,970 B2
(45) Date of Patent: Oct. 24, 2006

(54) COMMUNICATION SYSTEM WITH BALANCED TRANSMISSION BANDWIDTH

(75) Inventor: Thomas George Zboril, Mississauga (CA)

(73) Assignee: Tropic Networks Inc., Kanata (CA)

( * ) Notice: Subject to any disclaimer, the term of this patent is extended or adjusted under 35 U.S.C. 154(b) by 1033 days.

(21) Appl. No.: 10/173,304

(22) Filed: Jun. 18, 2002

(65) Prior Publication Data

US 2003/0117945 A1    Jun. 26, 2003

(51) Int. Cl.
*H04J 3/04*    (2006.01)
*G01R 31/08*   (2006.01)

(52) U.S. Cl. .................. 370/535; 370/242; 718/105

(58) Field of Classification Search .............. None
See application file for complete search history.

(56) References Cited

U.S. PATENT DOCUMENTS

| | | | |
|---|---|---|---|
| 5,608,733 A | 3/1997 | Vallee et al. | |
| 5,875,192 A | 2/1999 | Cam et al. | |
| 6,188,699 B1 | 2/2001 | Lang et al. | |
| 6,285,679 B1 | 9/2001 | Dally et al. | |
| 6,307,906 B1 | 10/2001 | Tanji et al. | |
| 6,370,145 B1 | 4/2002 | Dally et al. | |
| 6,498,781 B1 * | 12/2002 | Bass et al. | 370/230.1 |
| 6,788,686 B1 * | 9/2004 | Khotimsky et al. | 370/394 |
| 6,894,977 B1 * | 5/2005 | Vallee | 370/236.2 |
| 6,934,293 B1 * | 8/2005 | DeJager et al. | 370/401 |
| 7,027,448 B1 * | 4/2006 | Feldmann et al. | 370/401 |
| 7,046,623 B1 * | 5/2006 | Kukic | 370/228 |
| 2002/0161565 A1 * | 10/2002 | Nelson et al. | 703/13 |

* cited by examiner

*Primary Examiner*—Duc Ho
(74) *Attorney, Agent, or Firm*—Victoria Donnelly

(57) ABSTRACT

A communication system such as a distributed packet switch, is described, including multiple nodes with bi-directional transmission links between the nodes, each link comprising of a set of multiple links in parallel. The system provides an automatic balancing the aggregate capacity of one set of links in a proportion "M:N" to the aggregate capacity of the other set of links under varying link conditions, including one or more individual link failures in one or both sets of links.

20 Claims, 10 Drawing Sheets

COMMUNICATION SYSTEM WITH BALANCED TRANSMISSION BANDWIDTH

FIELD OF THE INVENTION

The invention relates to high capacity switching, and in particular, to a communication system with balanced transmission bandwidth.

BACKGROUND OF THE INVENTION

A system architecture that is suitable for high capacity switches includes a set of nodes, each node containing external input/output (I/O) ports as well as being part of a distributed switching fabric.

In U.S. Pat. No. 6,370,145 (Dally, et al.) is described an example of a switching system (an internet router) which is composed of a multi-hop network of fabric routers (nodes or switch elements) which effectively constitute a distributed switch fabric providing connectivity between I/O ports contained within the fabric routers.

User data traffic may enter the system at an I/O port of one of the nodes (the ingress node) and leave through an I/O port of another node (the egress node). Traffic may be routed from one I/O port of a node to an I/O port on the same node, but the case of greater interest is where the egress node differs from the ingress node. If the ingress node does not have a direct link to the egress node, data traffic is switched through a number of intermediate nodes acting as tandem nodes.

In a distributed fabric architecture, all nodes are of equal or similar design and contain means to fulfill the roles of ingress, tandem, and egress nodes dynamically as required.

To switch traffic, virtual circuits (VCs) are set up between ingress nodes and egress nodes, where the forward channel is used to transmit user data, and the reverse channel carries flow control (back pressure) signals. The reverse channel may also be carrying user data in the opposite direction, and flow control signals are usually combined with user traffic.

Such system architecture relies on large input buffers and output buffers associated with the I/O ports of each node, and an end-to-end flow control regime to guarantee a high quality of service. On its way from an ingress node to an egress node, traffic going through a tandem node however bypasses the I/O port buffers in the nodes that are acting as tandem nodes. As in any multi-stage fabric, the internal links between the nodes can be overloaded if appropriate measures are not taken.

A commonly used measure to prevent data loss is to provide link-by-link flow control on the internal links between the nodes. This is a second type of backpressure or flow control, in addition to the end-to-end flow control regime provided between ingress and egress nodes. For cost and delay reasons, the sizes of buffers in the tandem nodes are kept small, requiring a very fast flow control mechanism capable of providing rapid backpressure to the port buffers.

In U.S. Pat. No. 6,285,679 (Dally, et al.) is described a multi-hop distributed switch system in which virtual circuits (VCs) are set up between ingress and egress nodes, through tandem nodes containing small buffers, one per VC, that can fill up quickly. A credit based flow control scheme is employed to propagate the state of tandem buffers back to ingress nodes.

Complications may arise in the design of the nodes and the backpressure mechanism when the links between the nodes are not direct but are made up of multiple links in parallel. This arrangement may be chosen to provide a higher capacity of transmission between nodes than becomes possible, or economically viable, with a direct (back plane or fiber link) connection. However, the available higher capacity must be utilized effectively to carry the traffic stream and the flow control signals.

Ribbon fiber cables and high-speed multi-fiber electro-optical transceiver modules have recently become available to enable such a system design. In U.S. Pat. No. 6,307,906 (Tanji, et al.) is described the basic concept of using a ribbon fiber cable for module interconnect, including a clock and data recovery scheme. Unfortunately, using a ribbon fiber cable as a parallel bus to interconnect the modules of a system has some disadvantages, e.g. when errors or failures of individual links within the cable are considered. For example, when used as a simple parallel bus, the loss of an individual link renders the entire bus unusable.

Another method to use a ribbon fiber cable is to consider each fiber as a serial channel (carrying complete cells or packets), and then use an inverse multiplexing scheme to distribute the traffic over the fibers in the cable, typically in a round-robin mode. This method would result only in some loss of capacity when a single link fails.

Inverse multiplexing was first proposed on a network scale, to bundle multiple lower speed links into a single higher speed logical link. Network scale inverse multiplexing is described in numerous U.S. Pat. No., among which U.S. Pat. No. 5,608,733 (Vallee, et al.), U.S. Pat. No. 5,875,192 (Cam, et al.).

The use of inverse multiplexing on a module-to-module scale is described in U.S. Pat. No. 6,188,699 (Lang, et al.). In such a scheme each physical link uses individual transmit and receive circuits for conveying data from the transmitter to the receiver, and common management circuits and packet buffer processors for coordinating the transfer over the group of physical links.

However, existing inverse multiplexing schemes are only adapted to the transfer of data between nodes that are capable of terminating packet (cell or ATM) protocols in the case of network scale inverse multiplexing, or contain network processors or the like in the case of module scale inverse multiplexing.

In a large switching system with a large number of internal virtual circuits (VCs) each requiring a queue per VC in each tandem node through which the VC passes, and with very high speed links connecting the nodes to each other, there are two important requirements: the cost of the intermediate buffers must be kept as low as possible, but their sizes must be adequate to handle the feedback volume.

Feedback volume is a term used to describe the amount of traffic (number of data packets) that will arrive at a receiver after the receiver has sent a backpressure signal to the transmitter. The feedback volume depends on the link speed, and on the delay of both the data path from the transmitter to the receiver, and the feedback path from the receiver to the transmitter.

A large number of VC's implies a large number of queues, and also a large number of flow control signals, which must be conveyed rapidly from the receivers to the transmitters. A large amount of flow control traffic requires a significant amount of bandwidth that is then not available for data traffic. If less bandwidth is made available for flow control, the end-to-end delay for flow control signals from receiver to transmitter is increased, which has the effect of increasing the required size of buffers at the receiver.

As a consequence, a very careful design decision must be made to provide sufficiently rapid flow control without using up an inordinate amount of bandwidth for control signals.

A reliable method of flow control is based on the concept of continuously reporting the receiver's queue and buffer status to the transmitters. The queue status may be the number of buffer spaces available to the queue of a VC, or it may be a single logical bit to express whether a certain fill threshold has been exceeded for a queue. The buffer status (irrespective of VC) may similarly be a number expressing the total amount of space available in the buffer, or a single logical bit triggered when a certain fill threshold has been exceeded. Both VC queues and buffer space may be divided according to a number of priority levels, and status information may be generated separately for each priority. The queue and buffer status information can be carried in the header of data packets (cells), including the headers of idle cells, or it can be transmitted in the payload of designated flow control cells. Flow control cells could be transmitted whenever there are no user data cells to be transmitted, but in the critical high-load situation flow control cells must be inserted at a minimum rate.

When multiple links, for example a ribbon multi-fiber cable, are employed to interconnect nodes, the bandwidth available on the multi-fiber link as a whole is the sum of the bandwidths of the individual links. However, under failure conditions, the aggregate bandwidth available on the multi-fiber link as a whole can be reduced, which may lead to a problem of increasing of the feedback volume, and cause buffer overruns and data loss.

Accordingly, there is a need in the industry for further development of means and methods of handling data and back pressure signals over such multiple links under variable conditions.

SUMMARY OF THE INVENTION

It is an objective of the present invention to develop means and methods to provide the link-by-link flow control system in a distributed switch fabric, which avoids the above-mentioned problems and drawbacks.

According to one aspect of the invention, there is provided a communication system having a first node and a second node, the first node being connected to the second node with a first set of multiple links for sending packets and feedback information from the first node to the second node, and the second node being connected to the first node with a second set of multiple links for sending packets and feedback information from the second node to the first node, the system comprising means for automatic balancing the aggregate capacity of the first set of links in a proportion "M:N" to the aggregate capacity of the second set of links under varying link conditions, including one or more individual link failures in one or both sets of links.

Advantageously, the means for balancing comprises means for automatically providing the aggregate capacity of the first set of links substantially equal to the aggregate capacity of the second sets of links. Conveniently, each link in the first and second sets of links may have substantially the same capacity. Alternatively, the means for automatic balancing may comprise means for automatically selecting a number of links which are active (transmitting data packets) in the first set and another number of links which are active in the second set, the numbers of the selected links being in the proportion "M:N", where M may be equal to N, or M may not be equal to N.

Beneficially, the means for automatic balancing comprises a first mesh port in the first node and a second mesh port in the second node, the first mesh port comprising means for determining how many links of the second set of links are operating (capable of receiving data correctly), and sending a signal regarding a status of the second set of links to the second mesh port in the second node. If required, the signal may be sent periodically.

Similarly, the second mesh port comprises means for determining how many links of the first set of links are operating, and sending a corresponding signal to the first mesh port in the first node. The communication system further comprises means for controlling how many links are active in each set of links and sending signals regarding the state of activity of the corresponding sets of links to the first and second mesh ports. Preferably, the signals regarding the state of activity of the corresponding sets of links are sent periodically.

The communication system further comprises means for determining the number of links to be assigned as active in each set of links, the number being the lesser of the number of the operating links in one set of links and the number of the active links in the other set of links. Conveniently, the signal regarding the status of the second set of links to the second mesh port in the second node is sent over each link of the first set of links.

According to another aspect of the invention, there is provided a node for a communication system, the node being a first node having a first set of multiple links for sending packets and feedback information to a second node connected to the first node with a second set of multiple links for sending packets and feedback information from the second node to the first node, the node comprising means for automatic balancing the aggregate capacity of the first set of links in a proportion "M:N" to the aggregate capacity of the second sets of links under varying link conditions, including one or more individual link failures in one or both sets of links.

According to yet another aspect of the invention there is provided a mesh port in a node for a communication system, connected by a first set of multiple links for sending packets and feedback information to a second mesh port in another node, the second mesh port being connected to the first mesh port with a second set of multiple links for sending packets and feedback information, the mesh port comprising means for automatic balancing the aggregate capacity of the first set of links in a proportion "M:N" to the aggregate capacity of the second sets of links under varying link conditions, including one or more individual link failures in one or both sets of links.

According to one more aspect of the invention there is provided a method for balancing a transmission bandwidth in a communication system having a first node and a second node, the first node being connected to the second node with a first set of multiple links for sending packets and feedback information from the first node to the second node, and the second node being connected to the first node with a second set of multiple links for sending packets and feedback information from the second node to the first node, the method comprising the step of controlling the capacity of sets of links by automatic balancing the aggregate capacity of the first set of links in a proportion "M:N" to the aggregate capacity of the second sets of links under varying link conditions, including one or more individual link failures in one or both sets of links.

Conveniently, the step of automatically balancing comprises the step of automatically providing the aggregate capacity of the first set of links substantially equal to the aggregate capacity of the second sets of links. If required, the step of automatic balancing may comprise the step of assigning substantially the same capacity to each link in the first and second sets of links. Alternatively, the step of automatic balancing may comprise the step of automatically selecting a number of links which are active (transmitting data packets) in the first set and another number of links which are active in the second set, the numbers of the selected links being in the proportion "M:N". The step of automatic balancing comprises the step of determining how many links of the second set of links are operating (correctly receiving data), and sending a signal regarding the status of the second set of links to the second mesh port in the second node. Preferably, the step of sending the signal regarding the status of the second set of links comprises the step of sending the signal periodically.

The step of determining how many links are operating further comprises determining how many links of the first set of links are operating, and sending a corresponding signal to the first mesh port in the first node. Additionally, this step further comprises the step of controlling how many links are active in each set of links and sending signals regarding the state of activity of the corresponding sets of links to the first and second mesh ports. The method further comprises the step for determining the number of links to be assigned as active in each set of links, the number being the lesser of the number of the operating links in one set of links and the number of the active links in the other set of links. Conveniently, the step of sending the signal regarding the status of the second set of links to the second mesh port in the second node comprises sending the signal over each link of the first set of links, e.g. repeatedly.

The described communication system provides an improvement over other systems currently known in industry due to the use of bandwidth equalization on the multiple links. This ensures that the feedback volume does not increase during fiber failures, permitting the use of much smaller buffers in the tandem nodes, which in turn, results in lower cost and better switch performance through lower delay, without the risk of data loss due to buffer overflow even during transient changes in link operation.

BRIEF DESCRIPTION OF THE DRAWINGS

The invention will now be described in greater detail with reference to the attached drawings, in which.

DETAILED DESCRIPTION

Distributed Packet Switching Fabric

Figure 1:
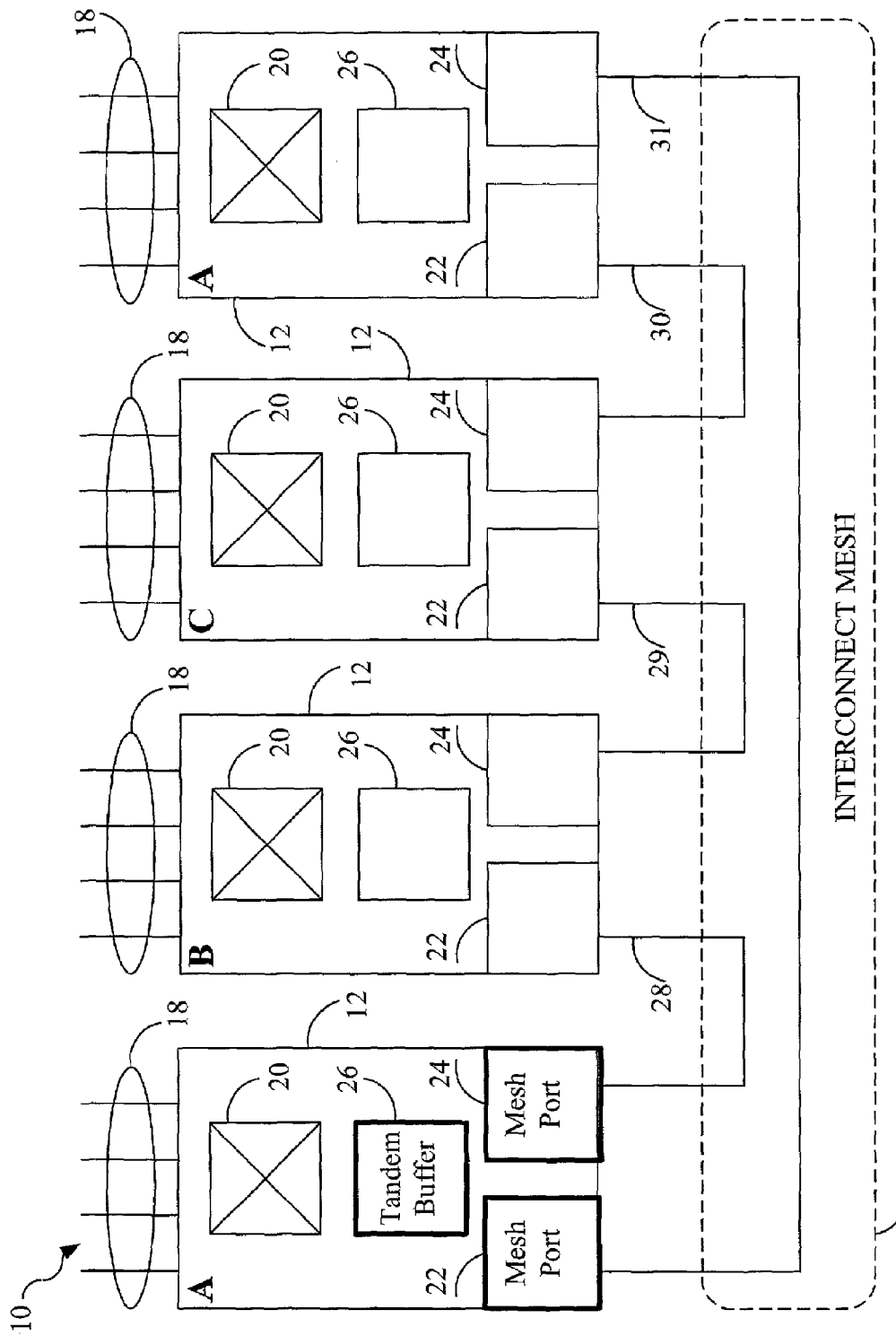
FIG. 1 is an illustration of a distributed packet switching system according to an embodiment of the invention.

In FIG. 1 is illustrated a distributed packet switching fabric 10 according to an embodiment of the invention, comprising four identical nodes 12 (nodes A, B, C, and D). Each node 12 has four external I/O ports 18, a local (internal) switching fabric 20, two mesh ports 22 and 24, and a tandem buffer 26.

The nodes 12 are interconnected by links 28, 29, 30, and 31 through an interconnect mesh 32.

Node A is connected with node B through link 28.
Node B is connected with node C through link 29.
Node C is connected with node D through link 30.
Node D is connected with node A through link 31.

Each of the links 28–31 is a multi-fiber link containing a number of individual fibers in each direction.

Only a small distributed packet switching fabric 10 is shown in FIG. 1. It is understood that the distributed packet switching fabric 10 may include larger numbers of nodes and I/O ports, and an interconnect mesh of greater complexity, but in the interest of clarity, the description of the system and its components is limited to smaller numbers.

Traffic from an I/O port 18 on node A to another I/O port 18 on node A would be handled by the local switching fabric 20 in node A, and is not of concern here.

Traffic from an I/O port 18 on node A (acting as ingress node) to an I/O port 18 on node B (acting as egress node) would travel over the link 28.

Traffic from an I/O port 18 on node A (acting as ingress node) to an I/O port 18 on node C (acting as egress node) could travel over link 28 to node B (acting as tandem node) and from node B to node C over link 29. Alternatively, node D could equally have been chosen as the tandem node (using inter-node links 31 and 30). The choice of tandem node, and routing within the switch in general, may be accomplished using any algorithm according to the state of the art.

Traffic between an I/O port 18 on one node 12 (acting as ingress node) and an I/O port 18 on a different node 12 (acting as egress node) is routed through a virtual circuit (VC), one virtual circuit having been established between every pair of nodes. A virtual circuit extends from the local switching fabric 20 in the ingress node to the local switching fabric 20 in the egress node.

Figure 2:
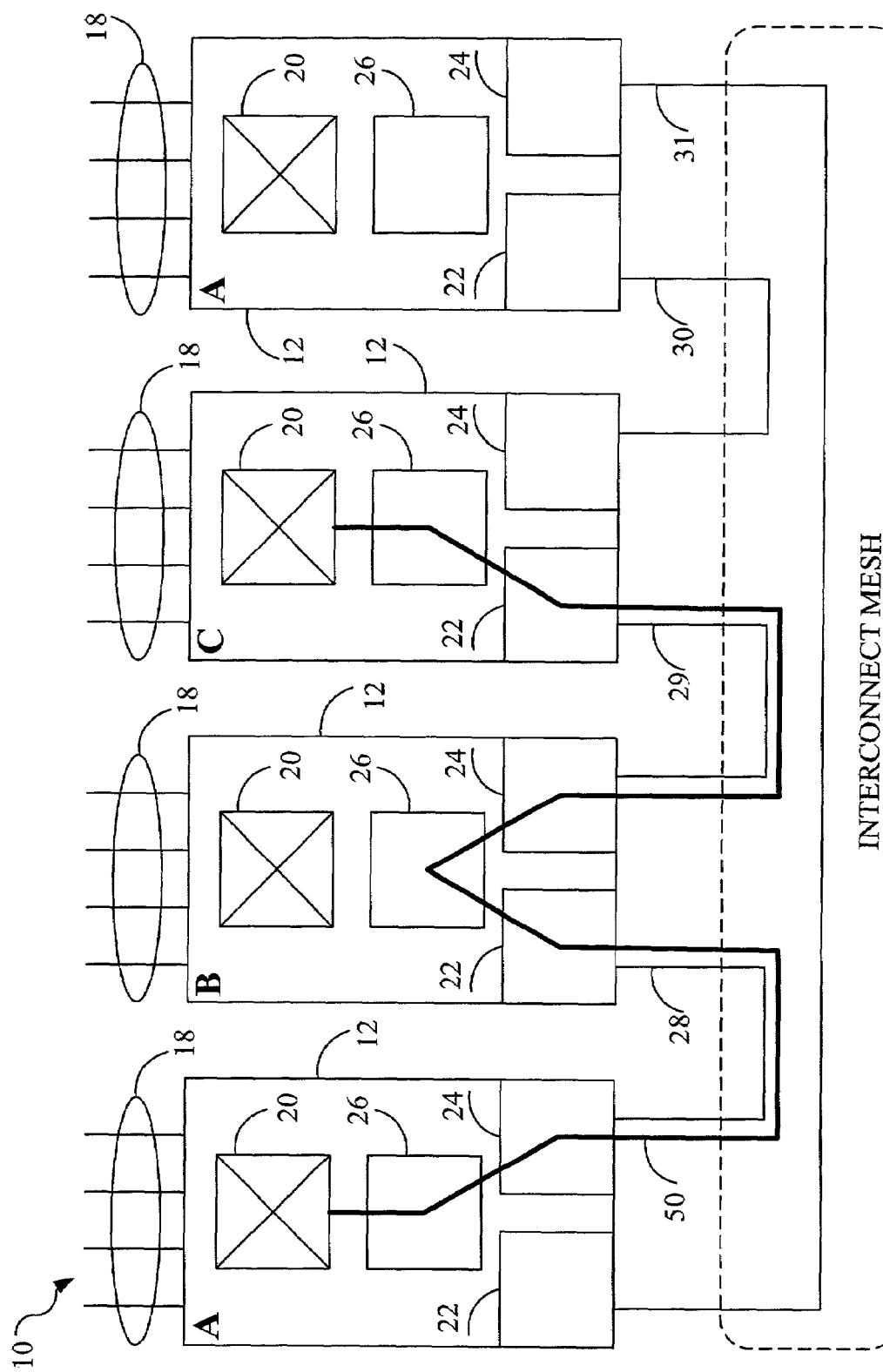
FIG. 2 is an illustration of a distributed packet switching system of FIG. 1 showing a virtual circuit.

In FIG. 2 is illustrated the distributed packet switching fabric 10 of FIG. 1, augmented to show a virtual circuit (VC) 50 from node A to node C. The virtual circuit 50, shown as a heavy line, extends from the local switching fabric 20 in node A through the mesh port 24 in node A, joined by link 28 to mesh port 22 in node B. Within node B, the VC 50 extends from mesh port 22 through the tandem buffer 26 to the mesh port 24 in node B. From node B, the virtual circuit 50 extends further through the link 29 to mesh port 22 in node C, and terminates at the local switching fabric 20 in node C.

Additional virtual circuits (not illustrated) are established from node A to node B, from node A to node D; and also from node B to each of nodes A, C, and D; from node C to each of nodes A, B, and D; and from node D to each of nodes A, B, and C.

Each tandem buffer 26 has a dedicated FIFO (first in, first out) queue for each virtual circuit that passes through it. In addition, multiple priority levels may be used to differentiate different types of traffic according to an assigned priority. If "P" levels of priority are used, each tandem buffer 26 contains "P" queues for each virtual circuit that passes through it.

The mesh ports 22 and 24 are identical instances of the mesh port 22 described below. In a larger distributed switching fabric containing more nodes, each node may contain additional mesh ports providing interconnection to other nodes.

The problem of providing an effective link-by-link and per-VC, per-priority flow control between the tandem buffers 26 in different nodes, while the aggregate multi-fiber link capacity may change, is solved with the help of an inverse mux/demux circuit (described below) and other components in mesh port 22 which maintain a balanced aggregate multiple link capacity in the two directions.

Tandem buffer 26 and mesh ports 22 and 24 of the first node 12 (node A) in FIG. 1 are shown in heavy outlines because they contain the primary means for flow control and balancing the aggregate transmission bandwidth.

Mesh Port and Tandem Buffer

Figure 3:
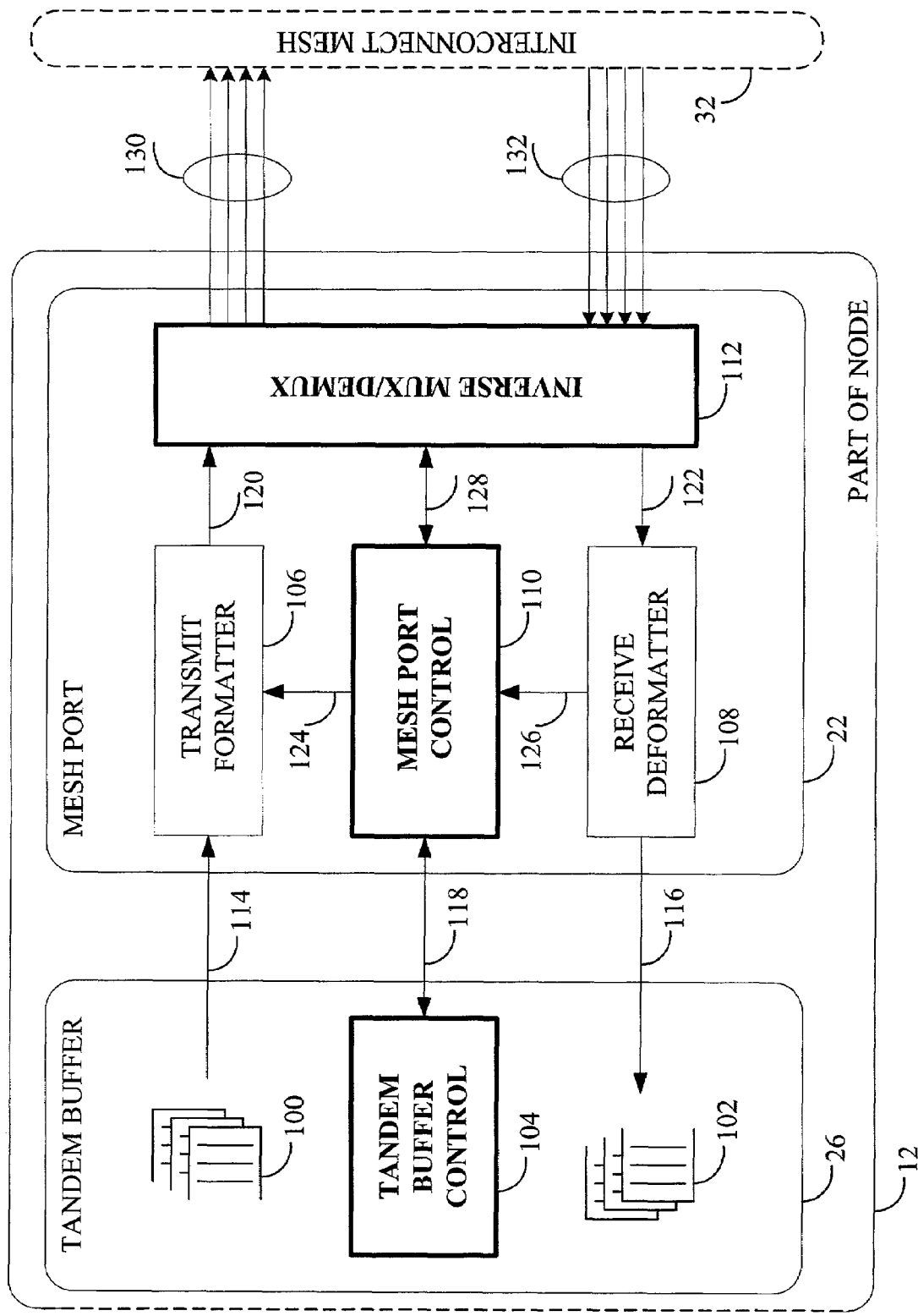
FIG. 3 is an illustration of part of a node showing a mesh port and tandem buffers of the system of FIG. 1.

In FIG. 3 are illustrated a part of a node 12 showing a tandem buffer 26 and a mesh port 22, and an interconnect mesh 32.

The tandem buffer 26 comprises a plurality of transmit queues 100, a plurality of receive queues 102, and a tandem buffer control 104.

The mesh port 22 comprises a transmit formatter 106, a receive deformatter 108, a mesh port control 110, and an inverse mux/demux circuit 112.

The transmit queues 100 in the tandem buffer are connected to the transmit formatter 106 in the mesh port over a data link 114. The receive queues 102 in the tandem buffer are connected to the receive deformatter 108 in the mesh port over a data link 116. The tandem buffer control 104 is connected with the mesh port control 110 over a control link 118.

Within the mesh port 22, the transmit formatter 106 is connected to the inverse mux/demux circuit 112 over a data link 120; the receive deformatter 108 is connected to the inverse mux/demux circuit 112 over a data link 122; the mesh port control is connected to the transmit formatter 106 over a control link 124; to the receive deformatter 108 over a control link 126; and has a control link 128 connecting it with the inverse mux/demux circuit 114.

The mesh port 22 is linked to another mesh port (the remote mesh port) in another node of the system over multi-fiber links 130 (transmit direction) and 132 (receive direction) through the interconnect mesh 32.

The plurality of transmit and receive queues 100 and 102 serve to buffer data traffic between the mesh port and the local switch fabric 20 (not shown in FIG. 3) in the node 12, as well as to buffer data traffic between one mesh port 22 of the node 12 and another mesh port (e.g. mesh port 24, not shown in FIG. 3) in the same node. The tandem buffer control 104 performs conventional buffer memory management and queue management functions. It also computes queue and buffer status information of the receive queues 102, and controls the order and rate in which the transmit queues 100 are served as a result of flow control information received from the mesh port control 110 over control link 118.

The transmit formatter 106 and the receive deformatter 108 in the mesh port 22 insert and remove the link-by-link flow control information. The link-by-link flow control information is in the form of a queue status sequence containing queue status bits (in groups of eight, eight queue status bits forming a queue status octet), one queue status bit for each virtual circuit for which a receive buffer is provided.

The first octet of the queue status sequence contains the buffer status, that is information describing the availability of the receive buffer as a whole, one bit per priority. The remote mesh port periodically inserts the queue status sequence describing the state of the remote receive buffers. The format of the queue status sequence will be described in more detail below with the aid of FIGS. 5 and 6.

The mesh port 22 at the near end extracts this information and, using the tandem buffer control 104, permits only transmit queues to be served for which a remote receive buffer (memory for the corresponding queue) is available. The differentiation by VC permits traffic to continue to flow on those VCs for which the receive buffers are not congested, while preventing buffer overflow for congested VCs.

When a transmit queue (assigned to a particular VC) of the tandem buffer is not permitted to send, a flow control signal is propagated upstream. Upstream is either the local switch fabric 20 which propagates the flow control state further upstream to an ingress port card (if the present node acts as an ingress node), or another mesh port which propagates the flow control state to the next node (if the present node acts as a tandem node). In either case, congestion on a link through the interconnect mesh causes backpressure to ultimately be propagated back to the ingress port card where a larger input buffer is available. The control intelligence (e.g. a network processor) associated with the ingress port card will then make a decision to buffer the data in its large ingress buffer, and possibly discard data that is of a lower priority. The concept of per-VC and per-priority queuing is well understood by persons skilled in the art.

We continue now with the description of FIG. 3.

The mesh port 22 also contains the inverse mux/demux circuit 112. The inverse mux/demux circuit 112 receives data packets from the transmit formatter 106 as a single data stream over the data link 120, and converts the data into multiple streams which are sent over the multi-fiber link 130 to the remote mesh port. The data streams from the remote mesh port arrive over the multi-fiber link 132 and are received by the inverse mux/demux circuit 112 in which they are converted to a single stream, and delivered to the receive deformatter 108 over the data link 122.

The control link 128 between the inverse mux/demux circuit 112 and the mesh port control is used for the reporting of the synchronization and fiber status of the links.

The inverse mux/demux circuit 112 will be described in more detail with the aid of FIG. 7 below, after a description of the signal formats has been presented.

The inverse mux/demux circuit 112 is shown in heavy outline in FIG. 3 because it contains the primary means for balancing the aggregate transmission bandwidth.

The blocks showing the mesh port control 110 and the tandem buffer control 104 are also shown in heavy outline in FIG. 3 because they contain the primary means to adapt the operation of the link-by-link flow control to the available aggregate balanced transmission bandwidth provided by the inverse mux/demux circuit 112.

Signal Formats

Figure 4:
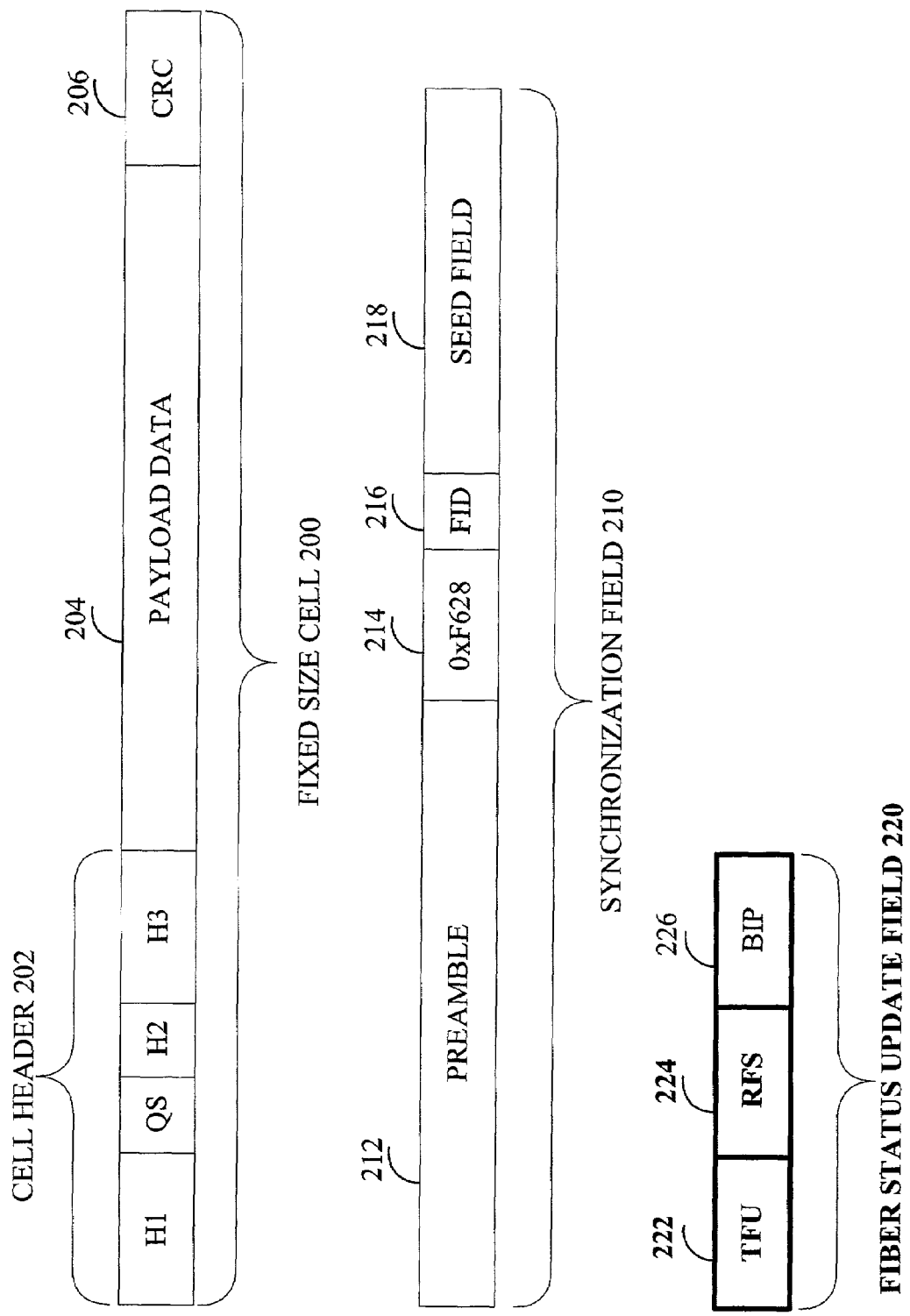
FIG. 4 is an illustration of the formats of a cell, a synchronization field, and a fiber status update field used in the system of FIG. 1.

In FIG. 4 are illustrated the basic packet (cell) format used in the preferred embodiment of the invention, and the formats of the fields used to synchronize a cell stream and to report the fiber status.

The basic packet is of a fixed size of 66 octets. Fixed size packets are commonly referred to as cells. The data transmitted on each fiber of a multi-fiber link 130 and 132 comprises a cell stream of fixed size cells (including data cells, idle cells, and control cells), interspersed at regular intervals with two other types of information units (synchronization fields and fiber status update fields) which are not of the same size as the fixed size cells.

The format of the cell stream, interspersed with synchronization fields and fiber status update fields will be described below with the aid of FIG. 5.

The format of a fixed size cell 200 is shown in FIG. 4. It contains a cell header 202, a payload data field 204, and a CRC (Cyclic Redundancy Code) field 206. The cell header 202 is divided into a number of header fields H1, H2, and H3, and a Queue Status field QS. The usage of the Queue Status field QS is common among all types of cells, but the usage of the header fields H1, H2, and H3 varies for different types of cells.

The overall length of a fixed size data cell 200 is 66 octets, composed of the cell header 202 of 6 octets, the payload data field 204 of 58 octets, and the CRC field 206 of 2 octets.

Internal packet (cell) formats are designed to serve a multitude of data transport and control functions. In the preferred embodiment of the present invention for example, a number of switch functions are enabled through various fields in the cell headers 202 of fixed size cells 200. Only those fields and functions which are directly relevant to the invention, or the understanding thereof, are described. Other fields are only briefly mentioned.

When a fixed size cell 200 is a data cell, the payload data field 204 contains user data. In a data cell, the header field H1 contains indicator bits and a multicast routing field; the header field H2 contains the virtual circuit identifier (VC) which is used to select the per-VC queue for storing the data at the receiving end of the link; the header field H3 contains a number of smaller fields indicating cell priority, packet identification, and packet segmentation information.

The fixed size cell format 200 is also used for idle cells (when no user data is available to be sent over the link, or when the link has been taken out of use). In idle cells, the header field H1 contains a unique code identifying the cell as an idle cell, and header fields H2 and H3 together contain a Remote Fiber Status (RFS) field. The Remote Fiber Status field contains one bit per fiber of a multi-fiber link, each bit indicating whether the corresponding fiber is working or not (as determined by the receiver of the multi-fiber link). The full remote fiber status (of all fibers in a multi-fiber link 130 and 132) is transmitted in the RFS fields of idle cells transmitted on each of the fibers in the opposite direction.

The fixed size cell format 200 is also used for control cells, one example of which is an end-to-end backpressure information cell. An end-to-end backpressure information cell carries end-to-end backpressure information in the payload data field transparently through the switch, from an egress node to an ingress node. In the case of an end-to-end backpressure information cell, the header field H1 contains a unique code identifying the cell as an end-to-end backpressure information cell; the header field H2 contains a count; and the header field H3 is combined with the payload data field extending its capacity to 60 octets for this type of cell.

In all types of fixed size cells 200 however, the Queue Status (QS) field in the header is used to convey queue status information from the tandem buffers 26 (FIGS. 2 and 3) at one end of a link to the tandem buffers 26 at the other end of the link.

The purpose of the CRC field 206 in every fixed size data cell 200 is the detection of errors. A cell that is received with an invalid CRC is discarded. If a number of successive cells fail their CRC check, the fiber link is considered to be out of synchronization, and not working. Non-working links are reported in the RFS field that is transmitted over the link in the opposite direction as was mentioned earlier.

Also illustrated in FIG. 4 is the format of a Synchronization Field 210. A synchronization field contains a preamble field 212 of 8 octets; a 2-octet synchronization pattern 214 having the value of hexadecimal F628; a 4-bit fiber identification (FID) field 216; and a seed field 218.

A synchronization field 210 is periodically interspersed in the stream of fixed size data cells. This serves two purposes, firstly to enable the inverse mux/demux circuit 112 (FIG. 3) at the receiving end of a link to recover the octet and cell alignment of the cell stream, and secondly to establish a frame reference for the transmission of a fiber status update and a queue status (QS) sequence as described below.

The preamble field 212 contains no data and is merely inserted to allow the multi-fiber receiver to operate asynchronously with respect to the multi-fiber transmitter at the other end of a link. Briefly explained, without such a preamble (or alternatively an equivalent forced insertion of idle cells), the buffers in a receiving switch node running asynchronously at a slightly lower clock rate than the transmitting switch node could overflow under heavy traffic. The periodic insertion of the preamble field (which may also be referred to as a stuff field), by the transmitter allows a receiver whose clock is slower, enough time to catch up during the period of the preamble since the preamble contains no data that need to be processed or buffered.

The synchronization pattern 214, following the preamble 212, allows a synchronization state machine to acquire initial synchronization, that is, octet and cell alignment.

The fiber identification (FID) field 216 serves to identify the individual fiber links of the multi-fiber link. A 4-bit field is used to identify up to sixteen fibers of a multi-fiber link. In the preferred embodiment of the system of the invention, a twelve-fiber link is used.

The seed field 218 contains a forty-two-bit pattern used to initialize a bit scrambler which is used to scramble the data bits on the link for the purpose of increasing the number of bit transitions, as is common in fiber transmission technology such as SONET (Synchronous Optical Network).

Also illustrated in FIG. 4 is the format of a Fiber Status Update (FSU) field 220. A FSU field 220 contains three subfields; a Transmit Fiber Usage (TFU) field 222; a Receive Fiber Status (RFS) field 224; and a Bit Interleaved Parity (BIP) field 226.

The TFU field 222 indicates which fibers of a multi-fiber link are active (transmitting data packets) in the transmit direction (the same direction as the FSU field 220). The RFS field 224 indicates to the transmitter which of the fibers are operating (correctly receiving data). The BIP field 226 provides error detection for the FSU field 220; each bit of the BIP field 226 contains the parity of the corresponding bits in the TFU (222) and RFS (224) fields.

The fiber status update (FSU) field 220 is transmitted periodically on all fibers of a multi-fiber link. The same bit patterns (TFU, RFS, BIP) are sent on all fibers.

Figure 5:
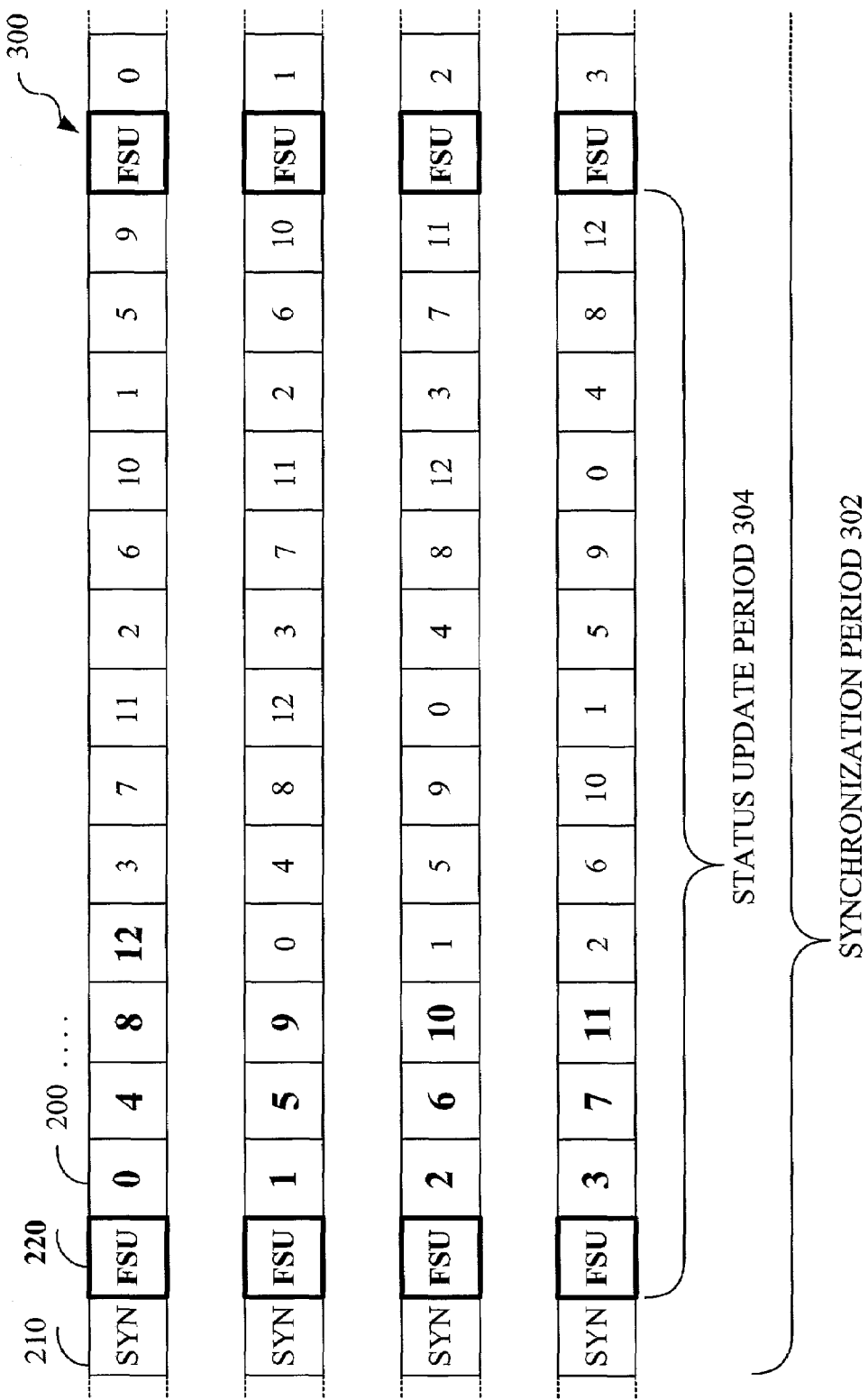
FIG. 5 is an illustration of the format of a multi-fiber cell stream in the system of FIG. 1.

In FIG. 5 is illustrated the frame format 300 of a cell stream that is transmitted over the fibers of a multi-fiber link. For the sake of clarity, the format is illustrated for a system of only four fibers, and only a short frame.

Each of the four rows in the diagram displays an excerpt of a cell stream transmitted on one of the four fibers of a multi-fiber link. Each cell stream has the same format, and all cell streams of a multi-fiber link are synchronous with each other.

The illustrated format shows 3 kinds of fields. Fields labeled SYN are synchronization fields 210; fields labeled FSU are Fiber Status Update fields 220; and fields labeled 0 to 12 are fixed size cells 200. The fixed size cells may be user data cells, idle cells, or backpressure information cells.

The SYN field 210 indicates the start of a synchronization period 302.

The FSU field 220 contains the TFU 222 and RFS 224 fiber status fields describing the current state of the fiber links; the FSU field 220 also indicates the start of a status update period 304.

The FSU field 220 and the TFU 222 and RFS 224 fiber status fields are shown in heavy outline in FIG. 4 because the method for balancing the aggregate transmission bandwidth relies on these fields.

Queue Status Sequence

As will be recalled from FIG. 4, all fixed size cells 200 have in common that their header 202 contains a queue status (QS) field. The sequence of queue status fields—distributed through the headers of the fixed size cells 200, and transmitted over the four streams in FIG. 5—constitute a queue status sequence. The cell labels 0 to 12 in FIG. 5 indicate the order of the QS fields within a queue status sequence. The nature of the remaining data within the fixed size cells 200 (whether they contain user data payloads, are idle cells, or contain backpressure information) is not indicated in the diagram of FIG. 5, and is not of concern at present.

The length of the status update period 304 is equal to the number of QS fields in the queue status sequence. In the present example, the number of QS fields in the queue status sequence is 13. Preferably, this number is prime with respect to the number of fibers. The number of complete queue status sequences within a status update period is equal to the number of fibers, and each fiber carries each differently numbered QS field (0 to 12) exactly once within a status update period. The fixed size cells 200 with the QS fields in their headers 202 that make up the first queue status sequence are shown in larger bold letters in FIG. 5.

The synchronization period 302 includes one or more status update periods, and a status update period always starts immediately after a SYN field 210. In this manner, and taking the fiber identity (FID field 216 within the SYN field 210) into account, the identity of the QS fields is implicitly known, in a similar manner as channels in a TDM system derive their identity from their position relative to a synchronization signal or frame pulse.

During each status update period 304 are thus transmitted, the fiber status (FSU field 220) of the multi-fiber link between two mesh ports, as well as a number of queue status sequences which indicate the status of the receive queues of the tandem buffers 26 associated with the mesh ports 22 and 24.

It will be appreciated that the length of the queue status sequence is directly related to the number of VCs for which receive queues are allocated in the receiving tandem buffer 26. As has been discussed earlier, the number of VCs is a function of the number of switch nodes 12 (which could range up to 256 in a large switch) and the number of priorities (for example 3).

The length of the queue status sequence, divided by the number of working fibers, determines approximately the delay incurred by the backpressure feedback from a receiving tandem buffer to the transmitting tandem buffer at the other end of the link. This can be seen in FIG. 5, which shows that a single queue status sequence (QS fields 0 to 12) is transmitted sequentially across all fibers in a cyclic succession, requiring 4 fixed cell periods. If a fiber were to fail, it would take a longer time to transmit the queue status sequence.

The FSU fields 220 are shown in heavy outline in FIG. 5 because the method for balancing the aggregate transmission bandwidth relies on these fields.

Figure 6:
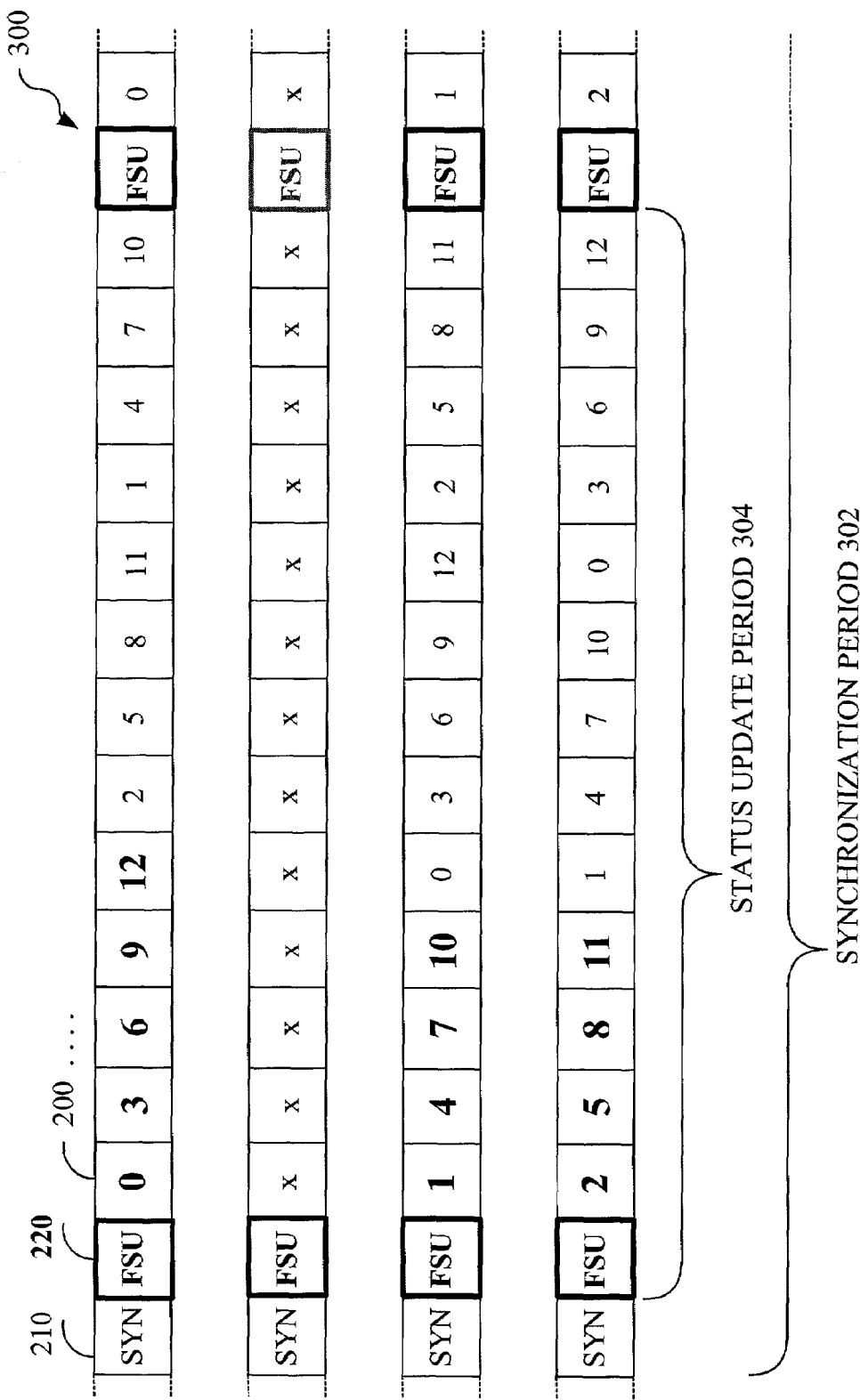
FIG. 6 is an illustration of the format of a multi-fiber cell stream after a fiber failure in the system of FIG. 1.

In FIG. 6 is illustrated the same cell stream format as in FIG. 5, but where the second fiber has failed (indicated by "x" in place of digits in the cell stream of the second row). The length of the status update period is not changed, but the queue status sequence of QS fields 0 to 12 is now spread out over 5 fixed cell periods.

Recall that the feedback volume of traffic is equal to the number of cells received on all fibers of a multi-fiber link during the period before the link-by-link backpressure feedback becomes effective.

If all fibers in one direction (the traffic direction) are working, while one or more fibers in the opposite direction (the feedback direction) are not working, it can now be seen that the feedback volume of traffic may suddenly increase after a fiber failure because the forward flow of traffic is not diminished, while the delay in the feedback direction is increased.

It is desirable to avoid this effect which would either result in lost traffic due to buffer overflow, or require larger buffers to be provided in anticipation of fiber failures. Larger buffers are more costly, are inconvenient to provide if physical space is at a premium, and are of no benefit in the normal (non-failure) case.

The Inverse Mux/Demux Circuit 112 (FIG. 3) is designed to solve this problem and provide link bandwidth equalization for the two directions of a multi-fiber link.

Inverse Mux/Demux Circuit

Figure 7:
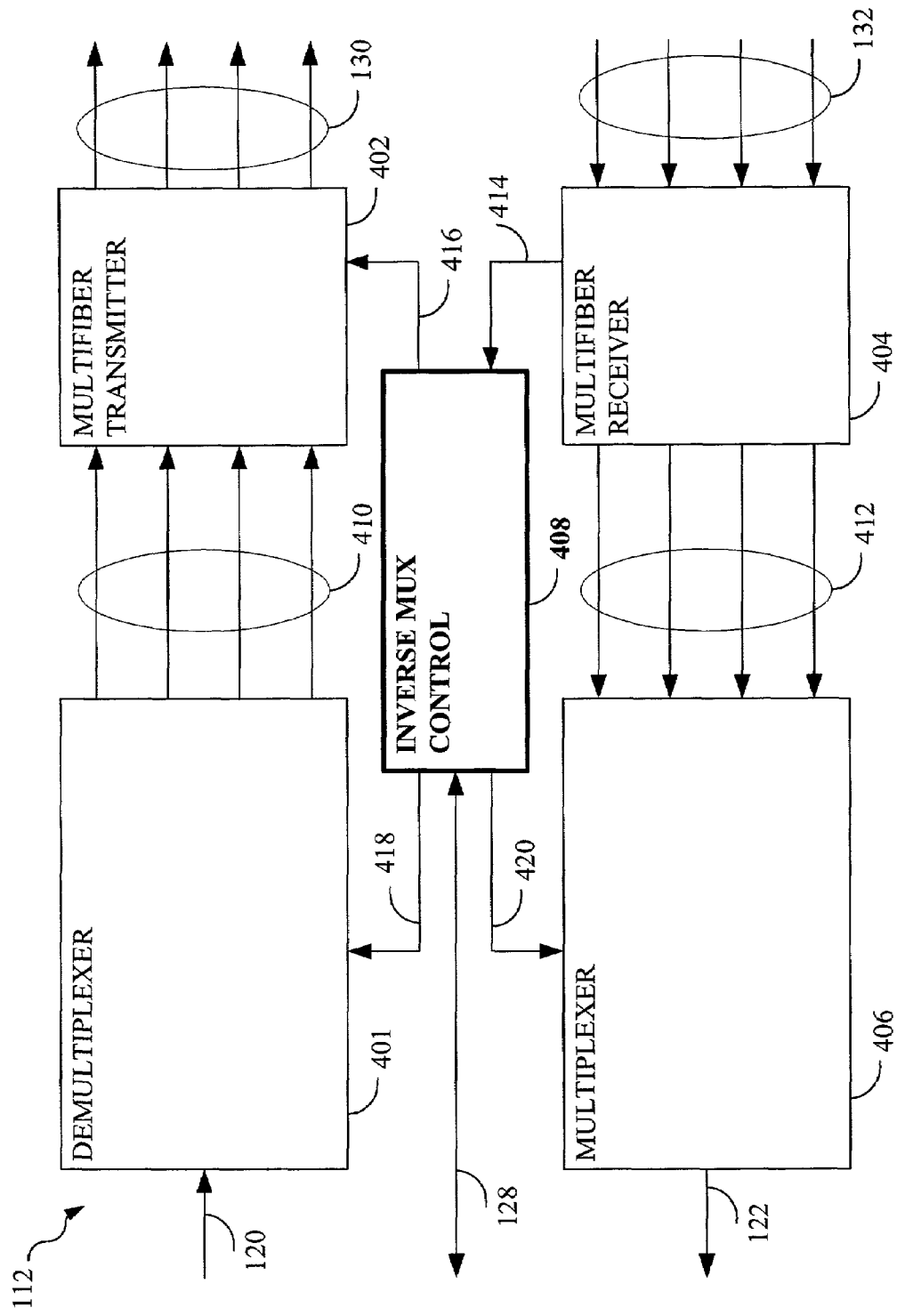
FIG. 7 is an illustration of an inverse multiplexer used in the mesh port of FIG. 3.

In FIG. 7 is illustrated an inverse mux/demux circuit 112 according to the preferred embodiment of the invention which provides balancing of the link bandwidth in the two directions. The inverse mux/demux circuit 112 comprises a demultiplexer 401; a multi-fiber transmitter 402; a multi-fiber receiver 404; a multiplexer 406; and an inverse mux control 408.

The demultiplexer 401 receives data (from the transmit formatter 106 in FIG. 3) over the single data link 120, and is connected to the multi-fiber transmitter 402 over a plurality of data links 410. The output of the multi-fiber transmitter 402 is connected to the multi-fiber link 130.

In the opposite direction, the multi-fiber receiver 404 receives data from the multi-fiber link 132 and is connected at its output to the multiplexer 406 over a plurality of data links 412. The output of the multiplexer 406 is the single data link 122 (connected to the receive deformatter 108 in FIG. 3).

The individual links making up the plurality of data links 410 and 412, correspond to the individual fibers of the multi-fiber links 130 and 132, and are also referred to as channels.

The inverse mux control 408 receives information over the control link 414 from the multi-fiber receiver 404, and sends control signals to the multi-fiber transmitter 402 over link 416; to the demultiplexer 401 over link 418; and to the multiplexer 406 over link 420. The inverse mux control 408 is also connected to the mesh port control 110 (FIG. 3) over control link 128.

The demultiplexer 401 receives a stream of formatted data packets (fixed size cells 200, see the format description of FIG. 4) from the data link 120, and inverse multiplexing control information from the inverse mux control 408 over the control link 418. The inverse multiplexing control information is in the form of TFU bits 222 indicating which of the fibers in the multi-fiber link 130 are active.

Consequently, in the manner of an inverse multiplexer, the function of the demultiplexer 401 is to distribute the cell stream received from the data link 120 over the data links 410 in round robin fashion, using only those data links 410 which correspond to active fibers, as indicated in the TFU information (in the form of TFU bits 222) received from the inverse mux control 408 over control link 418. A continuous sequence of idle cells is sent on all inactive links that are indicated in the TFU information. Idle cells are also inserted whenever no data cells are available on the data link 120.

The demultiplexer 401 also inserts the SYN 210 and FSU 220 fields in each of the outgoing signals on the data links 410.

The multi-fiber transmitter 402 converts the bit stream received on each of the channels (data links) 410 into an optical signal, to be sent out over the corresponding each of the fibers in the multi-fiber link 130. The control signal (TFU information 222) from the inverse mux control 408, received by the multi-fiber transmitter 402 over control link 416, indicates which of the channels are active. Also received over the control link 416 are the RFS bits 224 generated by the multi-fiber receiver 404 (see below). These RFS bits 224 are inserted in the FSU fields 220, as well as in the headers 202 of all idle cells, of the outgoing signals sent on the multi-fiber link 130.

The multi-fiber receiver 404 receives the fibers that make up the multi-fiber link 132, and converts the optical signals into electrical channels (the data links 412). The multi-fiber receiver 404 uses the received SYN fields 210 to establish octet and cell alignment. It reports to the inverse mux control 408 the receive state of each fiber (working/non-working) in the form of RFS bits 224 over the control link 414. The multi-fiber receiver 404 also extracts and decodes the FSU fields 220 received on each fiber and passes them to the inverse mux control 408 over the control link 414.

Not shown is the functionality which generates timing for the insertion of SYN 210 and FSU 220 fields in the transmit direction, and achieves alignment of the received cell streams with the local clock in the receive direction. These functions are readily understood by persons skilled in the art.

The FSU field 220 also marks the start of the status update period 304 (FIG. 5), the timing of which is needed by the mesh port control 110 and the tandem buffer control 104 (FIG. 3), in order to insert and receive the queue status sequences correctly. This timing information is passed from the inverse mux control 408 over link 128 to the mesh port control 110, and thence to the tandem buffer control 104 over link 118.

The function of the multiplexer 406 is to combine the fixed size cells 200 from the working channels of links 412 into a single data stream to be sent over link 122 to the receive deformatter 108 (in FIG. 3). The control signal 420 received from the inverse mux control circuit 408 indicates to the multiplexer 406 which channels 412 are working since only working channels carry data cells and need to be multiplexed.

The block showing the inverse mux control 408 is shown in heavy outline in FIG. 7 because it is the primary means for balancing the transmission bandwidth.

Link Bandwidth Equalization

Inverse multiplexing, as described above, works better when all fiber channels are working. If there are K fiber channels, each providing a data rate of L Gigabits/sec, the aggregate data rate is K times L Gigabits/sec. This indicates that traffic can be transferred from the tandem buffer in one node, to the tandem buffer in another node (the remote node) connected by the working multi-fiber link, at the rate of K times L Gigabits/sec. Similarly, the flow control signals returned by the remote node are embedded in a data stream of a rate of K times L Gigabits/sec.

The feedback volume has been defined as the product of the data rate and the sum of the transmission delay in the forward direction and the delay experienced by flow control signals in the reverse direction.

The dimensioning of the receive buffers has to take the feedback volume into account. In other words, if no cells are to be lost, the receive buffer must have sufficient extra space left to store the feedback volume after it sends a congestion signal to the transmitter. For cost and performance reasons, this buffer space should be small. When all system parameters are known, including the maximum delay of links, the design can take these parameters into account.

The use of multi-fiber links however introduces a variability: individual fiber links may fail, reducing the effective bit rate in one direction.

If the bit rate in the forward direction remains unaffected, but the bit rate is reduced in the reverse direction due to a fiber link failure, the flow of data does not decrease, but the delay of the backpressure signal increases. As a result, the feedback volume increases which would require more buffer space at the receiver. As discussed earlier, one solution would be to provide the additional buffer space, to handle the worst case.

A better solution was found to be more effective, and was chosen in the preferred embodiment. That solution is to provide a balanced transmission bandwidth in the two directions of a multi-fiber link under normal conditions of operation, and also when link failures occur.

If the bandwidth in one direction is reduced due to a fiber link failure, the bandwidth in the opposite direction is automatically reduced to the same amount by selecting fewer active fibers. By this simple strategy, the feedback volume does not increase when there is a loss of a fiber. Consequently, no additional buffer space has to be provided in the receive buffers, regardless of how many fibers are actually available in each direction of a link.

What is required is a mechanism to ensure that the number of fibers transmitting traffic (in one direction) does not exceed the number of fibers available for sending queue status information (in the opposite direction). This mechanism must be quick enough to respond rapidly in the case of fiber failure, and it should also be capable of initializing itself correctly when the link is first turned on.

The simple (conventional) inverse multiplexing scheme is enhanced with an improved inverse mux control function that is responsive to the fiber status in both directions of a multi-fiber link, to ensure both ends of an inverse multiplexed link (multi-fiber link) converge rapidly on a common number of channels (individual fibers) to be used in each direction.

Figure 8:
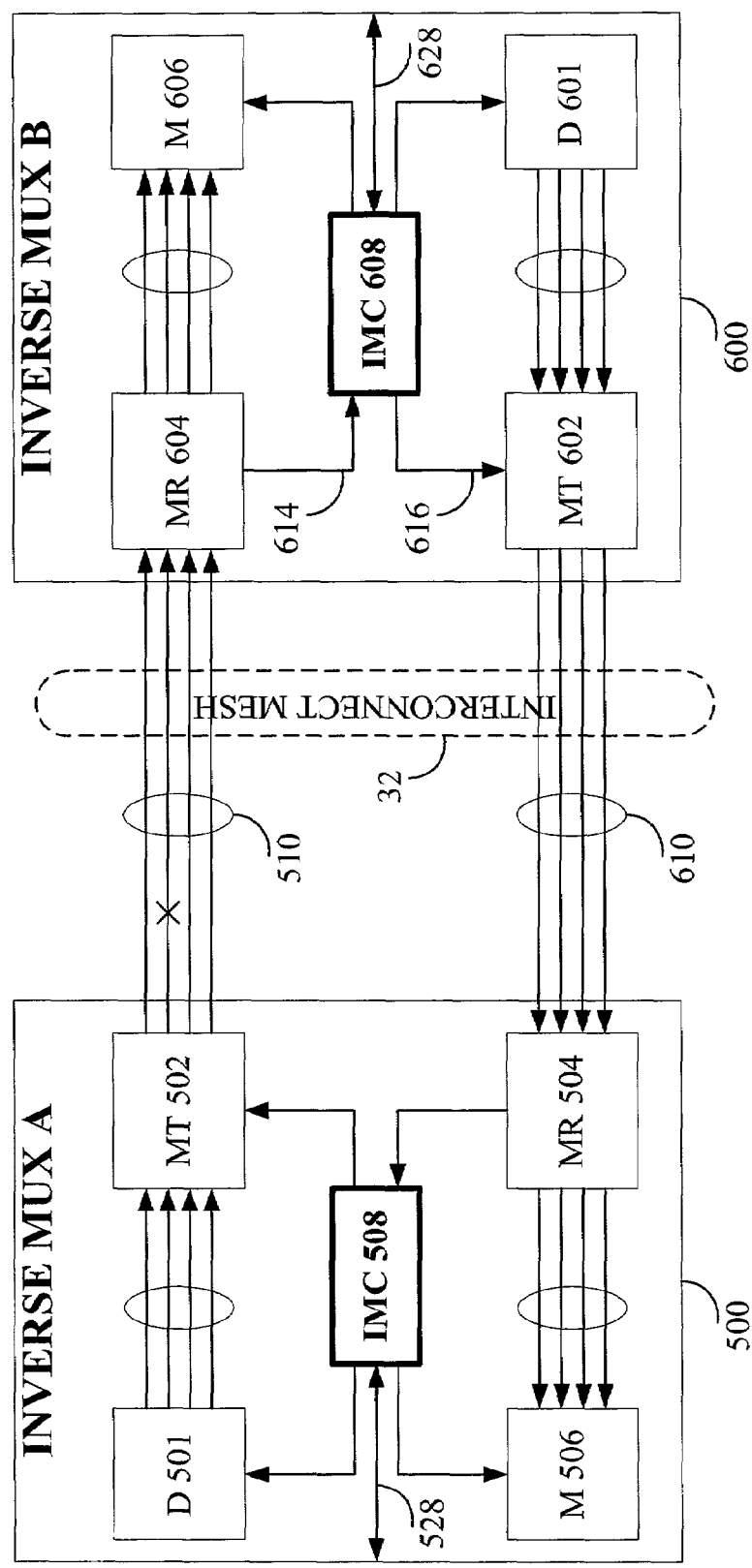
FIG. 8 is an illustration of two interconnected inverse multiplexers of FIG. 7.

In FIG. 8 are shown two inverse mux/demux circuits 500 and 600 (Inverse Mux A and Inverse Mux B) each of them being an instance of the inverse mux/demux circuit 112 of FIG. 7. Each inverse mux/demux circuit comprises the same components as the inverse mux/demux circuit 112 shown in FIG. 7: The inverse mux/demux circuit 500 contains a demultiplexer (D) 501; a multi-fiber transmitter (MT) 502; a multi-fiber receiver (MR) 504; a multiplexer (M) 506; and an inverse mux control (IMC) 508. Similarly, the inverse mux/demux circuit 600 contains the corresponding components, a demultiplexer (D) 601; a multi-fiber transmitter (MT) 602; a multi-fiber receiver (MR) 604; a multiplexer (M) 606; and an inverse mux control (IMC) 608.

The items in each inverse mux/demux circuit 500 and 600 are shown in FIG. 8 using analogous reference numbers to the corresponding items in FIG. 7. The control links 528 and 628 are the same as link 128 (FIG. 3), leading back to the mesh port control of the respective mesh port.

Two multi-fiber links 510 (from A to B) and 610 (from B to A) connect the inverse mux/demux circuits 500 and 600 through the interconnect mesh 32. The multi-fiber link 510 is connected from the multi-fiber transmitter (MT) 502 in inverse mux/demux circuit 500 to the multi-fiber receiver (MR) 604 in inverse mux/demux circuit 600. Similarly, the multi-fiber link 610 in the opposite direction is connected from the multi-fiber transmitter (MT) 602 in inverse mux/demux circuit 600 to the multi-fiber receiver (MR) 504 in inverse mux/demux circuit 500.

The inverse mux controls (IMC) 508 and 608 of inverse muxes A and B respectively contain the logic to evaluate the actual status (working or not working) of the received channels, as well as the reported fiber status update fields 220 (containing TFU 222 and RFS 224 bits) and the RFS bits in the headers 202 of received idle cells (a form of the fixed size cells 200) in the receive direction; and to generate the data for the fiber status update fields 220 (containing TFU 222 and RFS 224 bits) and the RFS bits in the headers 202 of idle cells in the transmit direction.

The blocks showing the inverse mux control circuits 508 and 509 are shown in heavy outline in FIG. 8 because they are the primary means for balancing the transmission bandwidth.

The RFS bits (RFS bits 224 in FSU 220 fields, and RFS bits in the headers 202 of idle cells) transmitted from either the inverse mux A or the inverse mux B reflect the working condition of the corresponding receive channels, i.e. the state of the frame synchronization (correct SYN 210 and cell CRC 206). Only after an RFS bit (in an FSU 220 field, or in the header 202 of an idle cell) is set by the inverse mux A, and received by the inverse mux B, can the inverse mux B begin transmitting data on the corresponding fiber.

Before transmitting data, the inverse mux B sets the corresponding transmit fiber usage (TFU 222) bit in all FSUs 220 sent from the inverse mux B to the inverse mux A. Data transmission only begins after the FSU field 220 is transmitted.

At the receiver (at the inverse mux A), all cells arriving on a link 610 (assuming frame synchronization has been established) are ignored except for CRC, and RFS and TFU extraction until the TFU 222 bit is set for that fiber.

Figure 9:
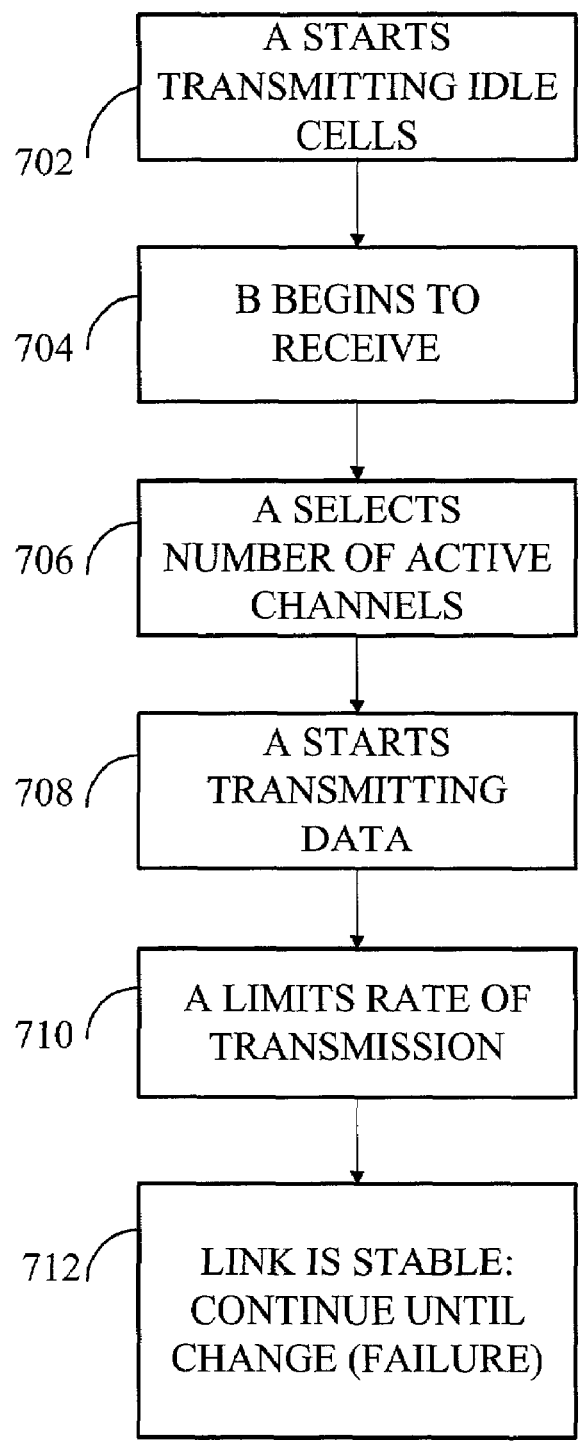
FIG. 9 is a flow chart of the startup sequence of the bandwidth balancing method according to an embodiment of the invention.

A link is brought into service in the following startup sequence 700, illustrated in FIG. 9. This description concentrates on the fibers from the multi-fiber transmitter MT 502 in the inverse mux A to the multi-fiber receiver MR 604 in the inverse mux B. The fibers in the opposite direction (MT 602 in the inverse mux B to MR 504 in the inverse mux A) are brought into service simultaneously in the same way, with roles reversed.

Step 702:

The multi-fiber transmitter MT 502 (in the inverse mux A) begins to transmit correctly formatted frames containing SYN 210 fields, FSU fields 220 with all TFU bits 222 cleared, and idle cells (a form of fixed cell 200), on all fibers. The RFS bits 224 in the FSU fields 220 and in the headers 202 of the idle cells reflect the status of the multi-fiber receiver MR 504.

Step 704:

The multi-fiber receiver MR 604 (in the inverse mux B) begins to receive the valid signals and synchronizes. The state of the receiver is reflected in the RFS bits (RFS 224 in FSU fields 220, and RFS bits in the headers 202 of idle cells) sent by the multi-fiber transmitter MT 602 (in the inverse mux B) back to the inverse mux A.

Step 706:

The multi-fiber receiver MR 504 (in the inverse mux A) receives RFS bits (RFS 224 in FSU fields 220, and RFS bits in the headers 202 of idle cells) and reports these to the inverse mux control IMC 508. The IMC 508 compares the number of received RFS bits set (indicating the number of working channels received by the inverse mux B) with the number of transmitted RFS bits set from step 704 (indicating the number of working channels received by the inverse mux A). If the number of received RFS bits set is not larger than the number of transmitted RFS bits set, then the TFU bits 222 for the channels corresponding to the received RFS bits set, are set (the TFU bits mirror the RFS bits). However if the number of received RFS bits set is larger than the number of transmitted RFS bits set, then the smaller number of TFU bits 222 are set, arbitrarily selected from among the working channels indicated by the received RFS bits that are set.

Step 708:

The demultiplexer D 501 (in the inverse mux A) is enabled via control link 518 to distribute the cell stream received on data link 520 only to channels 510 which correspond to TFU bits 222 being sent out in the fiber state update (FSU) fields 220.

Step 710:

The rate at which the associated tandem buffer is allowed to send data is limited (through a control signal sent back via control link 528) to a rate (bandwidth) equivalent to the lesser of the number of TFU bits 222 received by MR 504, and the RFS bits (RFS 224 in FSU fields 220, and RFS bits in the headers 202 of idle cells) sent by MT 502.

Step 712:

The procedure results in a stable link where the number of TFU bits 222 set and the number of RFS bits (RFS 224 in FSU fields 220, and RFS bits in the headers 202 of idle cells) set are the same in both directions, assuming no fiber failure has occurred.

This procedure is required to ensure that the feedback of queue status information is always equal or faster than the flow of data. In this way, the feedback volume does not increase during transient behavior of a link, or when a fiber fails.

When a fiber fails (indicated to the transmitter in the received RFS bits, that is RFS 224 in FSU fields 220, and RFS bits in the headers 202 of idle cells), the transmitter stops using that fiber, clears the corresponding TFU bit, and reduces the rate of traffic, see step 710 above. This automatically removes the fiber from the queue status sequence as illustrated in FIG. 6 above.

The result of a fiber failure is thus a reduction in the effective bandwidth available for the queue status sequence. To compensate for this, the link in the opposite direction is degraded so that the data bandwidth is also reduced.

Figure 10:
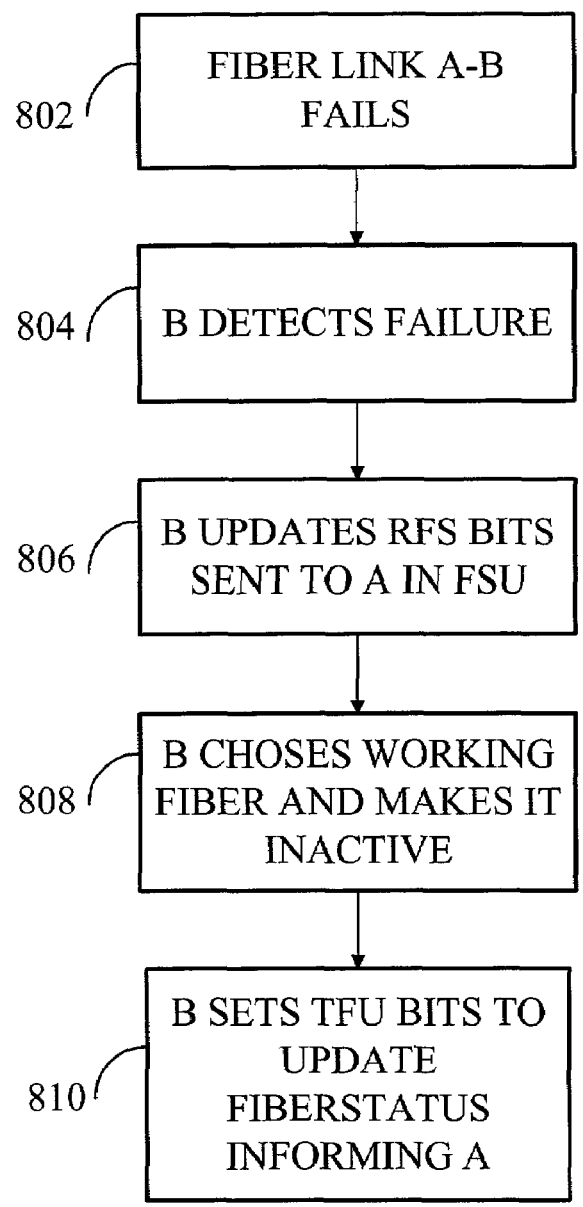
FIG. 10 is a flow chart of the rebalancing sequence of the bandwidth balancing method according to an embodiment of the invention.

Thus, assuming one of the fibers (x) in the multi-fiber link 510 (from the inverse mux A to the inverse mux B) fails, the following steps of the Rebalancing Sequence 800, illustrated in FIG. 10, occur:

Step 802:

A fiber link in the multi-fiber link 510 (from the inverse mux A to the inverse mux B) fails.

Step 804:

The multi-fiber receiver (MR) 604 in the inverse mux B detects loss of synchronization on the failed fiber link (x) and reports the loss to the inverse mux control (IMC) 608 over the control link 614.

Step 806:

The IMC 608 updates the RFS bits passed to the multi-fiber transmitter (MT) 602 (via control link 616), for insertion in the headers 202 all outgoing idle cells (a form of fixed cell 200) and in the fiber status update (FSU 220) fields of all outgoing channels.

Step 808:

The inverse mux control (IMC) 608 in the inverse mux B (without waiting for the RFS bits to actually have been sent in step 806) chooses one working (active) fiber; informs the associated mesh port control 110 and tandem buffer control 104 of the unavailability of this fiber (via control link 628); and instructs the multi-fiber transmitter (MT) 602 (via control link 616) to immediately begin sending only idle cells on that fiber, making it inactive.

Step 810:

The corresponding TFU bits 222 (in the FSU fields 220) for that fiber are cleared at the next opportunity so as to take the cells on this fiber out of the queue status sequence. This serves to keep the feedback volume in the other direction constant.

Thus, a communication system is provided which has at least two nodes, e.g. a first node (A) and a second node (B), the first node being connected to the second node with a first set of multiple links for sending packets and feedback information from the first node to the second node, and the second node being connected to the first node with a second set of multiple links for sending packets and feedback information from the second node to the first node, the system comprising means for automatic balancing the aggregate capacity of the first set of links in a proportion "1:1" to the aggregate capacity of the second set of links under varying link conditions, including one or more individual link failures in one or both sets of links.

In such a system, a significant improvement is achieved by using bandwidth equalization on those links. This ensures that the feedback volume does not increase during fiber failures, permitting the use of much smaller buffers in the tandem nodes which in turn results in lower cost and better switch performance through lower delay, without the risk of data loss due to buffer overflow even during transient changes in link operation.

In a modification to the described embodiment, the balancing of aggregate link bandwidth (capacity) may also be designed to achieve, and automatically maintain, a balance of M:N, where the ratio of M:N is a ratio of 1:1 or substantially equal to 1:1 (as described in the embodiment of the invention above) or any other ratio.

In a further modification to the described embodiment, the capacities of the individual links of a multi-link interconnection (such as a multi-fiber link) may differ, while the aggregate capacities in the two directions of a multiple link are held substantially equal, or are held to a ratio of M:N as mentioned earlier.

While in the system of one embodiment of the invention multi-fiber links are used as the multiple links for the inter-node connections, other link technologies, for example but not limited to; copper pairs; coaxial cables; and wireless links; may also be used in other embodiments of the invention.

Although specific embodiments of the invention have been described in detail, it will be apparent to one skilled in the art that variations and modifications to the embodiments may be made within the scope of the following claims.

What is claimed is:

1. A communication system having a first node and a second node, the first node being connected to the second node with a first set of multiple links for sending packets and feedback information from the first node to the second node, and the second node being connected to the first node with a second set of multiple links for sending packets and feedback information from the second node to the first node, the system comprising means for automatic balancing the aggregate capacity of the first set of links in a proportion "M:N" to the aggregate capacity of the second set of links under varying link conditions, including one or more individual link failures in one or both sets of links, each link in the first and second set of links has substantially the same capacity, and the means for automatic balancing comprises means for automatic selecting a number of links which are active (transmitting data packets) in the first set and another number of links which are active in the second set, the numbers of the selected links being in the proportion "M:N".

2. A communication system of claim 1, wherein M=N.

3. A communication system of claim 1, wherein the means for automatic balancing comprises a first mesh port in the first node and a second mesh port in the second node, the first mesh port comprising means for determining how many links of the second set of links are operating (correctly receiving data), and sending a signal regarding a status of the second set of links to the second mesh port in the second node.

4. A communication system of claim 3, wherein the signal regarding the status of the second set of links is sent periodically.

5. A communication system of claim 3, wherein the second mesh port comprises means for determining how many links of the first set of links are operating, and sending a corresponding signal to the first mesh port in the first node.

6. A communication system of claim 5, further comprising means for controlling how many links are active in each set of links and sending signals regarding the state of activity of the corresponding sets of links to the first and second mesh ports.

7. A communication system of claim 6, wherein the signals regarding the state of activity of the corresponding sets of links are sent periodically.

8. A communication system of claim 6, further comprising means for determining the number of links to be assigned as active in each set of links, the number being the lesser of the number of the operating links in one set of links and the number of the active links in the other set of links.

9. A communication system of claim 8, wherein the signal regarding the status of the second set of links to the second mesh port in the second node is sent over each link of the first set of links.

10. A node for a communication system, the node being a first node having a first set of multiple links for sending packets and feedback information to a second node connected to the first node with a second set of multiple links for sending packets and feedback information from the second node to the first node, the node comprising means for automatic balancing the aggregate capacity of the first set of links in a proportion "M:N" to the aggregate capacity of the second sets of links under varying link conditions, including one or more individual link failures in one or both sets of links, each link in the first and second set of links has substantially the same capacity, and the means for automatic balancing comprises means for automatic selecting a number of links which are active (transmitting data packets) in the first set and another number of links which are active in the second set, the numbers of the selected links being in the proportion "M:N".

11. A mesh port in a node for a communication system, connected by a first set of multiple links for sending packets and feedback information to a second mesh port in another node, the second mesh port being connected to the first mesh port with a second set of multiple links for sending packets and feedback information, the mesh port comprising means for automatic balancing the aggregate capacity of the first set of links in a proportion "M:N" to the aggregate capacity of the second sets of links under varying link conditions, including one or more individual link failures in one or both sets of links, each link in the first and second set of links has substantially the same capacity, and the means for automatic balancing comprises means for automatic selecting a number of links which are active (transmitting data packets) in the first set and another number of links which are active in the second set, the numbers of the selected links being in the proportion "M:N".

12. In a communication system having a first node and a second node, the first node being connected to the second node with a first set of multiple links for sending packets and feedback information from the first node to the second node, and the second node being connected to the first node with a second set of multiple links for sending packets and feedback information from the second node to the first node, a method for controlling transmission bandwidth comprising the step of automatic balancing the aggregate capacity of the first set of links in a proportion "M:N" to the aggregate capacity of the second sets of links under varying link conditions, including one or more individual link failures in one or both sets of links, each link in the first and second set of links has substantially the same capacity, and the means for automatic balancing comprises means for automatic selecting a number of links which are active (transmitting data packets) in the first set and another number of links which are active in the second set, the numbers of the selected links being in the proportion "M:N".

13. A method of claim 12, wherein the step of automatic balancing comprises assigning M=N.

14. A method of claim 12, wherein the step of automatic balancing comprises the step of determining how many links of the second set of links are operating (correctly receiving data), and sending a signal regarding the status of the second set of links to the second mesh port in the second node.

15. A method of claim 14, wherein the step of sending the signal regarding the status of the second set of links comprises the step of sending the signal periodically.

16. A method of claim 14, wherein the step of determining further comprises determining how many links of the first set of links are operating, and sending a corresponding signal to the first mesh port in the first node.

17. A method of claim 16, further comprising the step of controlling how many links are active in each set of links and sending signals regarding the state of activity of the corresponding sets of links to the first and second mesh ports.

18. A method of claim 17, further comprising the step for determining the number of links to be assigned as active in each set of links, the number being the lesser of the number of the operating links in one set of links and the number of the active links in the other set of links.

19. A method of claim 18, wherein the step of sending the signal regarding the status of the second set of links to the second mesh port in the second node comprises sending the signal over each link of the first set of links.

20. A method of claim 18, wherein the step for determining the number of links to be assigned as active is performed repeatedly.

* * * * *